US011117112B2

(12) United States Patent
Brown et al.

(10) Patent No.: US 11,117,112 B2
(45) Date of Patent: Sep. 14, 2021

(54) PRESSURE-BASED CONTROL OF FLUIDIZED BED REACTOR

(71) Applicant: REC Silicon Inc, Moses Lake, WA (US)

(72) Inventors: Kahl Brown, Moses Lake, WA (US); Matthew J. Miller, Moses Lake, WA (US); Benjamin Center, Moses Lake, WA (US); Gerald A. Zeininger, Long Beach, CA (US); Stein Julsrud, Moses Lake, WA (US)

(73) Assignee: REC Silicon Inc, Moses Lake, WA (US)

( * ) Notice: Subject to any disclaimer, the term of this patent is extended or adjusted under 35 U.S.C. 154(b) by 0 days.

(21) Appl. No.: 16/833,446

(22) Filed: Mar. 27, 2020

(65) Prior Publication Data

US 2020/0306712 A1    Oct. 1, 2020

Related U.S. Application Data

(60) Provisional application No. 62/825,729, filed on Mar. 28, 2019.

(51) Int. Cl.
    *B01J 8/18*    (2006.01)
    *B01J 8/24*    (2006.01)

(52) U.S. Cl.
    CPC .... B01J 8/1809 (2013.01); *B01J 2208/00539* (2013.01); *B01J 2219/002* (2013.01);
    (Continued)

(58) Field of Classification Search
    CPC . B01J 8/1809; B01J 8/0035; B01J 8/24; B01J 8/245; B01J 2208/00539;
    (Continued)

(56) References Cited

U.S. PATENT DOCUMENTS 5,284,676 A *  2/1994  Accuntius .............. B01J 8/1809
                                                 427/213
6,301,546 B1 * 10/2001  Weinstein .............. B01J 8/1809
                                                  702/23

(Continued)

FOREIGN PATENT DOCUMENTS

CN      107857269      3/2018
WO      WO 00-43118    7/2000
WO      WO 2014/063017 4/2014

OTHER PUBLICATIONS

International Search Report and Written Opinion issued in related International Application No. PCT/US2020/025527, dated Jul. 13, 2020, 14pps.

(Continued)

Primary Examiner — Lessanework Seifu
(74) Attorney, Agent, or Firm — Klarquist Sparkman, LLP

(57) ABSTRACT

A method of controlling particle additions to a fluidized bed reactor includes measuring pressure fluctuations inside the fluidized bed reactor over a selected time period, determining a pressure parameter indicative of amplitudes of the pressure fluctuations, comparing the pressure parameter to a specified threshold, and controlling particle additions to the fluidized bed reactor when the pressure parameter deviates from the specified threshold.

20 Claims, 12 Drawing Sheets

(52) U.S. Cl.
CPC .................. *B01J 2219/0022* (2013.01); *B01J 2219/00164* (2013.01)

(58) Field of Classification Search
CPC ........ B01J 2219/00164; B01J 2219/002; B01J 2219/0022; B01J 2219/00231; B01J 2219/00234
See application file for complete search history.

(56) References Cited

U.S. PATENT DOCUMENTS

| 2010/0068116 | A1 | 3/2010 | Kim et al. |
| 2010/0226844 | A1 | 9/2010 | Spangler et al. |
| 2012/0173165 | A1 | 7/2012 | Bhusarapu et al. |
| 2013/0149228 | A1 | 6/2013 | Martinez et al. |
| 2014/0112831 | A1 | 4/2014 | Chew et al. |
| 2018/0072577 | A1 | 3/2018 | Chew et al. |

OTHER PUBLICATIONS

Brue, "Pressure fluctuations as a diagnostic tool for fluidized beds," *Iowa State University*, 1996, 190pps.

Vakhishouri, "Influence of the Distributor and the Plenum Chamber Volume on Fluidized Bed Hydrodynamics," *The University of British Columbia*, Jun. 2008, 135pp.

Falkowski and Brown, "Analysis of Pressure Fluctuations in Fluidized Beds," *Iowa State University*, 2004, 11pps.

Falkowski, "The analysis and modeling of pressure fluctuations in a fluidized bed," *Iowa State University*, 2003, 169pp.

Sobrino et al., "Standard deviation of absolute and differential pressure fluctuations in fluidized beds of group B particles," *The Institution of Chemical Engineers*, Feb. 2008, 7pps.

\* cited by examiner

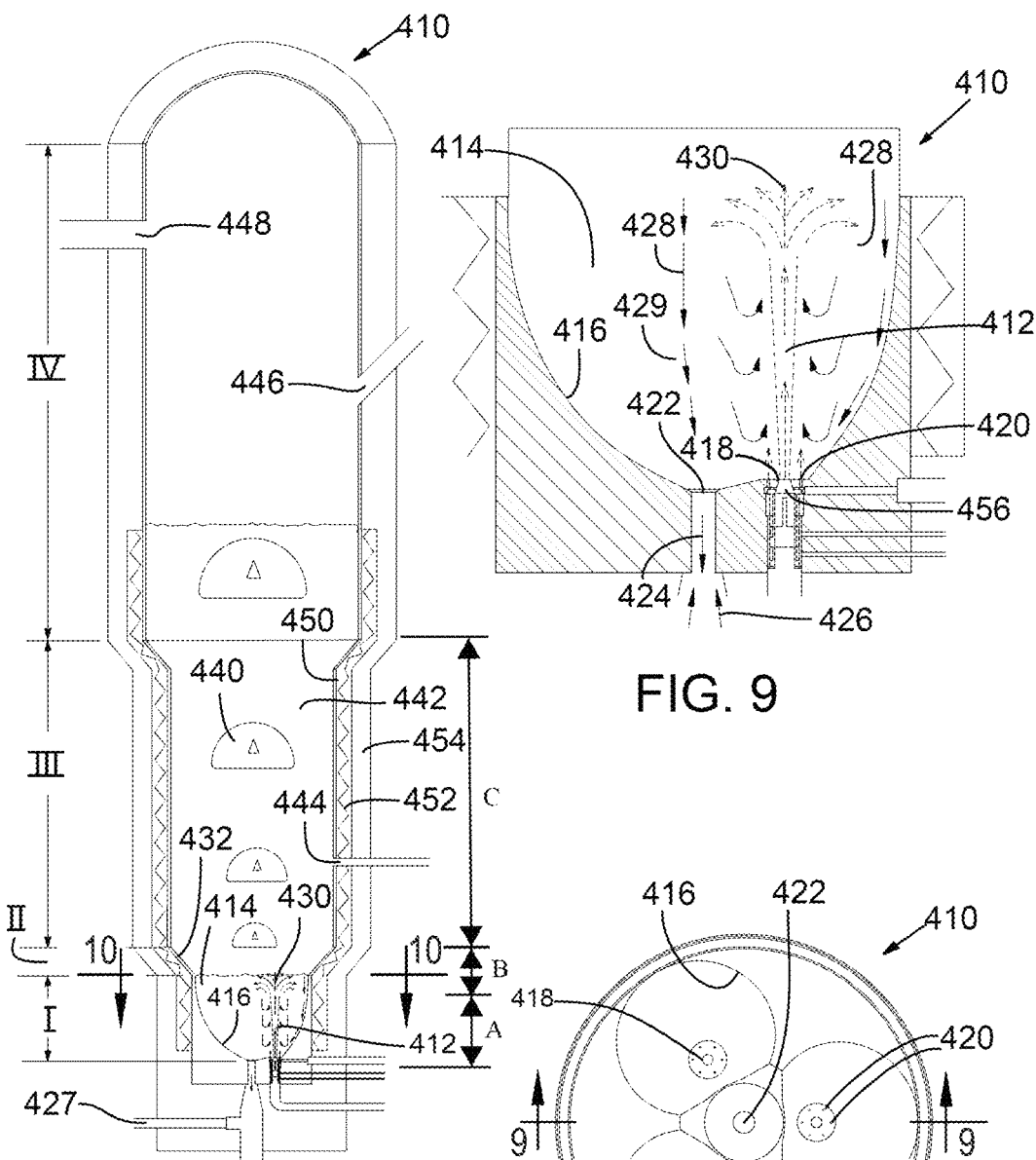
FIG. 8
FIG. 9
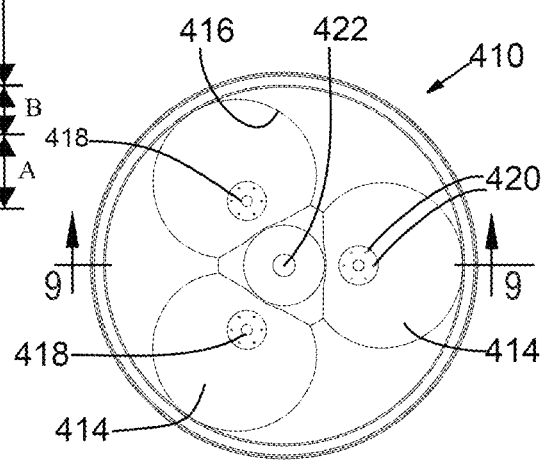
FIG. 10

PRESSURE-BASED CONTROL OF FLUIDIZED BED REACTOR

CROSS REFERENCE TO RELATED APPLICATION

The present application claims the benefit of U.S. Provisional Application No. 62/825,729, filed on Mar. 28, 2019, which is incorporated herein by reference in its entirety.

FIELD

The present disclosure pertains to pressure-based control of fluidized bed reactors.

BACKGROUND

Pyrolytic decomposition of silicon-bearing gas in fluidized beds is an attractive process for producing polysilicon for the photovoltaic and semiconductor industries due to excellent mass and heat transfer, increased surface for deposition, and continuous production. Compared with a Siemens-type reactor, the fluidized bed reactor offers considerably higher production rates at a fraction of the energy consumption. The fluidized bed reactor can be continuous and highly automated to significantly decrease labor costs.

One common problem in fluidized bed reactors is maintaining the particle size distribution of the particles in the fluidized bed within selected bounds. As silicon or other materials are deposited on the particles, the particles grow in size, which can affect the bulk flow properties of the particles and change the fluidization characteristics of the particle bed. This, in turn can affect the product, material consumption, and the efficiency of the reactor. Accordingly, there exists a need for improvements to systems and methods for controlling the particle size distribution in fluidized bed reactors.

SUMMARY

The present disclosure concerns systems and methods of controlling the rate of seed particle addition to a fluidized bed reactor based on changes in the amplitude of pressure fluctuations over time, which can be indicative of the particle size distribution or mean particle size of the particles in the fluidized bed. In a representative embodiment, a method comprises measuring pressure fluctuations inside a fluidized bed reactor over a selected time period, determining a pressure parameter indicative of amplitudes of the pressure fluctuations, comparing the pressure parameter to a specified threshold, and controlling particle additions to the fluidized bed reactor when the pressure parameter deviates from the specified threshold.

In any or all of the disclosed embodiments, measuring pressure fluctuations further comprises measuring pressure fluctuations in the fluidized bed reactor at or below a location where gas is injected into the fluidized bed reactor.

In any or all of the disclosed embodiments, measuring pressure fluctuations further comprises measuring pressure fluctuations in the fluidized bed reactor at or below a location where gas bubbles form in a fluidized bed of the fluidized bed reactor.

In any or all of the disclosed embodiments, determining the pressure parameter further comprises determining a difference between a maximum pressure and a minimum pressure over the selected time period.

In any or all of the disclosed embodiments, determining the pressure parameter further comprises determining a moving average of the difference between the maximum pressure and the minimum pressure of the selected time period and at least one earlier time period.

In any or all of the disclosed embodiments, determining the pressure parameter further comprises determining a moving average of maximum pressure amplitudes based on the selected time period and at least one earlier time period.

In any or all of the disclosed embodiments, determining the pressure parameter further comprises determining a standard deviation of the pressure over the selected time period.

In any or all of the disclosed embodiments, determining the pressure parameter further comprises determining a standard deviation of pressure maximums over the selected time period, determining a standard deviation of pressure minimums over the selected time period, determining a pressure variance over the selected time period, or any combination thereof.

In any or all of the disclosed embodiments, the method further comprises determining a difference between the pressure parameter and the specified threshold, and controlling particle additions further comprises determining a rate at which to add particles to the fluidized bed reactor based at least in part on the difference between the pressure parameter and the specified threshold.

In any or all of the disclosed embodiments, controlling particle additions further comprises increasing a rate at which particles are added to the fluidized bed reactor when the pressure parameter is below the specified threshold and decreasing the rate at which particles are added to the fluidized bed reactor when the pressure parameter is above the specified threshold.

In any or all of the disclosed embodiments, the method further comprises pyrolyzing silicon-bearing gas in the fluidized bed reactor to produce polysilicon particles.

In another representative embodiment, method comprises determining a pressure parameter indicative of amplitudes of pressure fluctuations in a fluidized bed reactor over a selected time period, comparing the pressure parameter to a pressure parameter set point, determining a rate at which to add particles to the fluidized bed reactor based at least in part on the comparison of the pressure parameter and the pressure parameter set point, and transmitting control signals to a particle supply system to supply particles to the fluidized bed reactor at the determined rate.

In any or all of the disclosed embodiments, determining the pressure parameter further comprises determining a difference between a maximum pressure and a minimum pressure over the selected time period.

In any or all of the disclosed embodiments, determining the pressure parameter further comprises determining a moving average of the difference between the maximum pressure and the minimum pressure of the selected time period and at least one earlier time period.

In any or all of the disclosed embodiments, determining the pressure parameter further comprises determining a moving average of maximum pressure amplitudes based on the selected time period and at least one earlier time period.

In any or all of the disclosed embodiments, determining the pressure parameter further comprises determining a standard deviation of a pressure over the selected time period, determining a standard deviation of pressure maximums over the selected time period, determining a standard deviation of pressure minimums over the selected time period, determining a variance of a pressure over the selected time period, or any combination thereof.

In another representative embodiment, an apparatus comprises a reactor vessel, a pressure sensor configured to sense a pressure inside the reactor vessel, a particle supply system in fluid communication with the reactor vessel, and a controller configured to receive data of the pressure in the reactor vessel from the pressure sensor over a selected time period, determine a pressure parameter indicative of amplitudes of pressure fluctuations over the selected time period based at least in part on the data of the pressure in the reactor vessel, compare the pressure parameter to a pressure parameter set point, determine a rate at which to add particles to the reactor vessel based at least in part on the comparison of the pressure parameter and the pressure parameter set point, and transmit control signals to the particle supply system to supply particles to the reactor vessel at the determined rate.

In any or all of the disclosed embodiments, determining the pressure parameter further comprises determining a difference between a maximum pressure and a minimum pressure over a selected time period associated with gas bubbles emerging from an at least partially fluidized particle bed in the reactor vessel.

In any or all of the disclosed embodiments, determining the pressure parameter further comprises determining a moving average of the difference between the maximum pressure and the minimum pressure of the selected time period and at least one earlier time period In any or all of the disclosed embodiments, determining the pressure parameter further comprises determining an average maximum pressure in the reactor vessel over the selected time period, determining a standard deviation of the pressure over the selected time period, determining a variance of a pressure over the selected time period, or any combination thereof.

The foregoing and other objects, features, and advantages of the disclosed embodiments will become more apparent from the following detailed description, which proceeds with reference to the accompanying figures.

BRIEF DESCRIPTION OF THE DRAWINGS

FIG. 8 is a schematic cross-sectional elevational view of an open configuration multiple augmented submerged spout fluidized bed reactor for silicon production with an ellipsoid chamber, three nozzles and central withdrawal, according to one embodiment.

FIG. 9 is an enlarged partial schematic cross-sectional elevational view of the spout chamber of FIG. 8.

FIG. 10 is an enlarged schematic cross-sectional view taken along line 10-10 of FIG. 8.

DETAILED DESCRIPTION

Described herein are systems and methods of controlling the particle size distribution in fluidized bed reactor systems by, for example, controlling the rate of seed particle addition based on parameters related to the amplitude of pressure fluctuations measured in the reactor vessel. The systems and methods described herein can be implemented, for example, in fluidized bed reactors used for the formation of polysilicon by pyrolytic decomposition of a silicon-bearing gas and deposition of silicon onto fluidized silicon particles or other seed particles (e.g., silica, graphite, or quartz particles). In certain embodiments, the addition of seed particles to the fluidized bed can be controlled based at least in part on pressure amplitude variations/fluctuations in certain zones of the reactor vessel. Variations/fluctuations of the pressure inside the reactor (e.g., variations/fluctuations in pressure over periods of time corresponding to events such as the formation of gas bubbles in a fluidized bed or emergence of such bubbles from the surface of the bed) can be associated with the particle size distribution of seed particles in the fluidized bed, and can be used to control particle additions and/or withdrawals to maintain the particle size distribution inside the reactor within selected bounds.

In certain embodiments, silicon can be deposited on particles in a reactor by decomposition of a silicon-bearing gas comprising, consisting essentially of or consisting of silane ($SiH_4$), disilane ($Si_2H_6$), higher order silanes ($Si_nH_{2n+2}$), dichlorosilane ($SiH_2Cl_2$), trichlorosilane ($SiHCl_3$), silicon tetrachloride ($SiCl_4$), dibromosilane ($SiH_2Br_2$), tribromosilane ($SiHBr_3$), silicon tetrabromide ($SiBr_4$), diiodosilane ($SiH_2I_2$), triiodosilane ($SiHI_3$), silicon tetraiodide ($SiI_4$), or any combination or mixture thereof. In some embodiments, the silicon-bearing gas may be mixed with one or more halogen-containing gases comprising, consisting essentially of or consisting of chlorine ($Cl_2$), hydrogen chloride (HCl), bromine ($Br_2$), hydrogen bromide (HBr), iodine ($I_2$), hydrogen iodide (HI), or any combination or mixture thereof. The silicon-bearing gas may also be mixed with one or more other gases, comprising, consisting essentially of or consisting of hydrogen ($H_2$) or one or more inert gases comprising, consisting essentially of or consisting of nitrogen ($N_2$), helium (He), argon (Ar), and neon (Ne). In particular embodiments, the silicon-bearing gas is silane, and the silane is mixed with hydrogen. The fluidized bed reactor systems described herein may also be used to deposit other materials onto seed particles by, for example, thermal decomposition of other precursor gases comprising the selected material.

EXAMPLE 1

Fluidized Bed Reactor

Figure 1A:
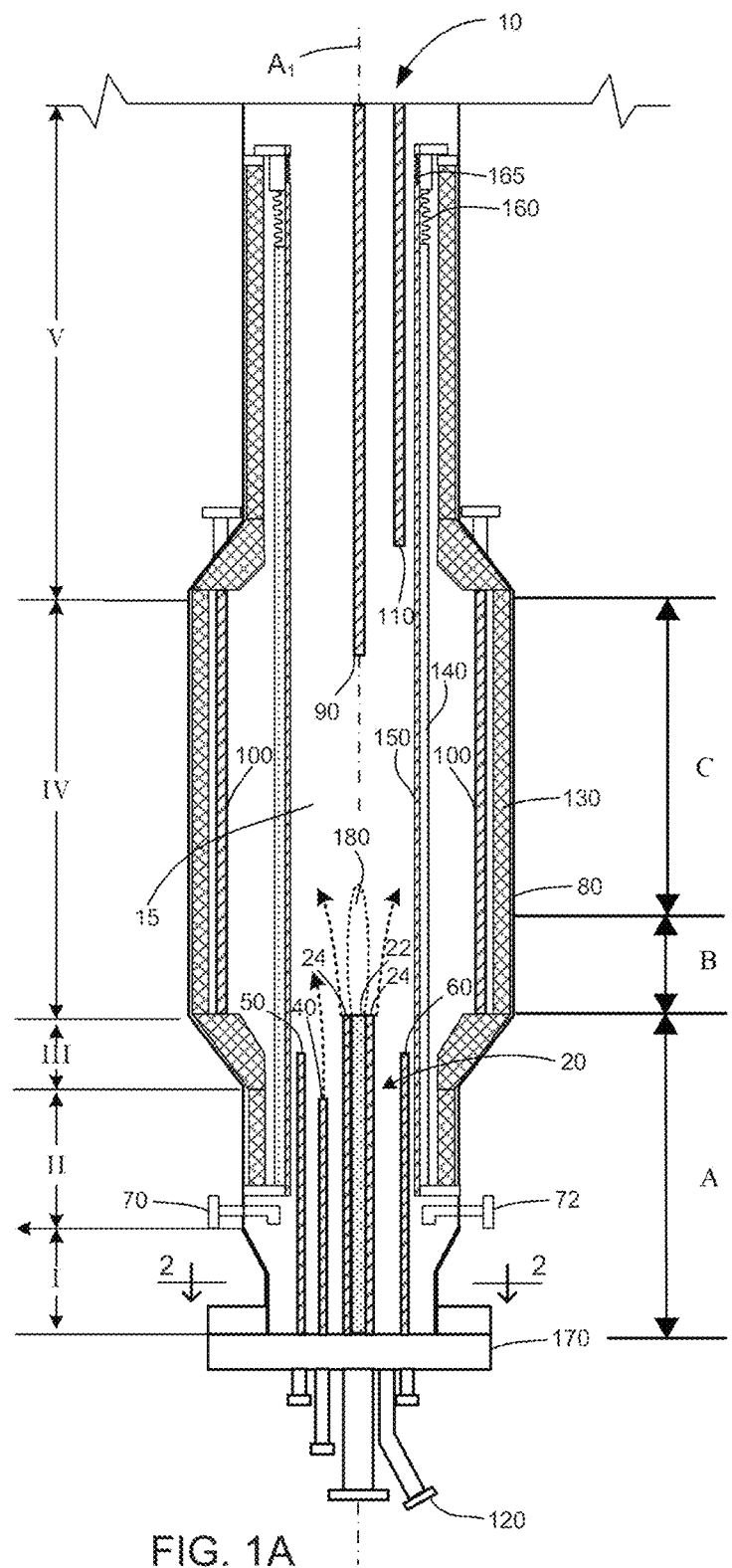
FIG. 1A is a schematic cross-sectional elevational view of a fluidized bed reactor, according to one embodiment.
Figure 1B:
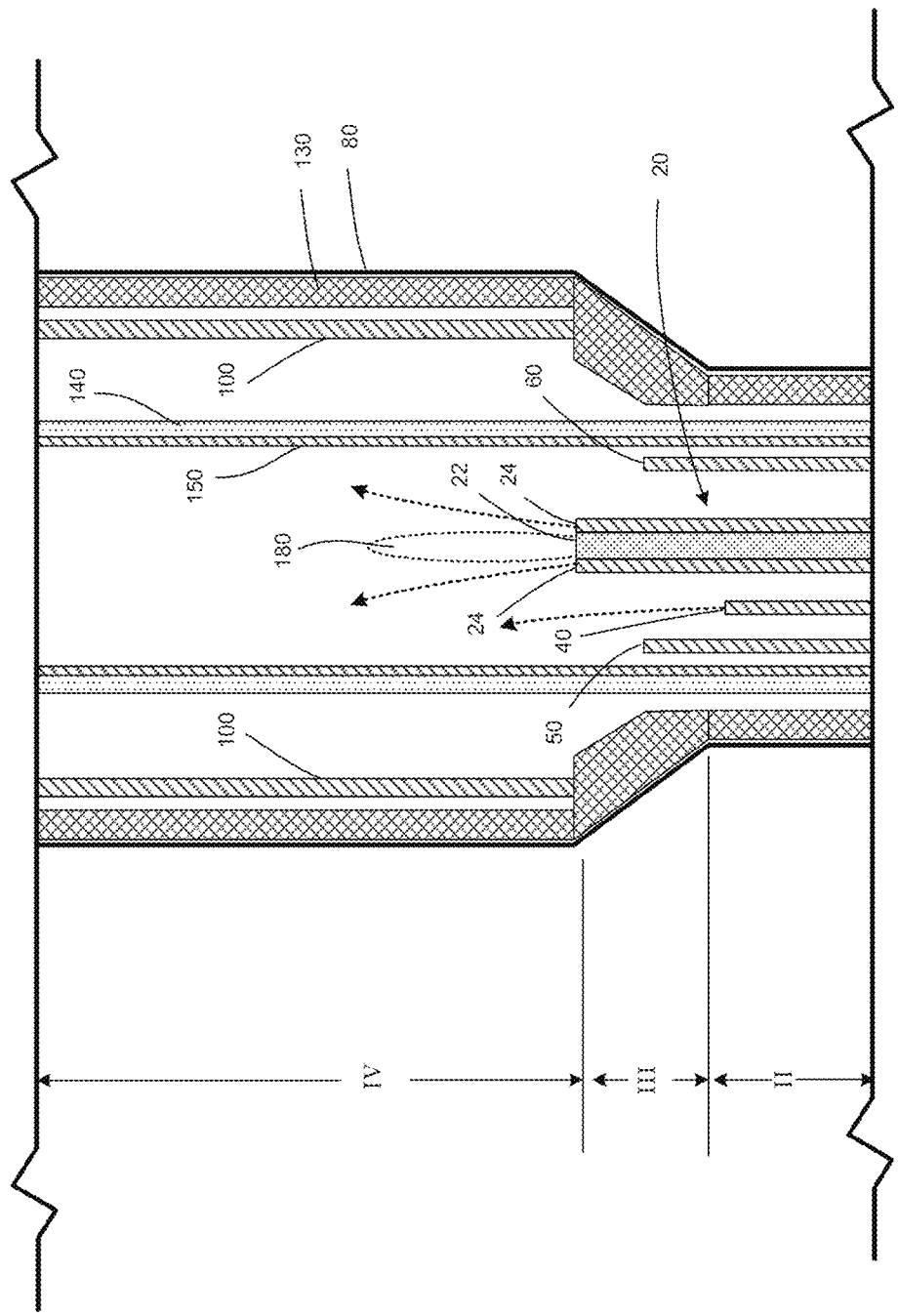
FIG. 1B is an enlarged view of a portion of the fluidized bed reactor of FIG. 1A.

In examples relating to polysilicon formation, silicon-bearing gas, along with any accompanying hydrogen, halogen-containing gases and/or inert gases, can be introduced via a nozzle into a fluidized bed reactor and thermally decomposed within the reactor to produce silicon which deposits upon seed particles inside the reactor. FIG. 1A is a schematic overview of a representative embodiment of a fluidized bed reactor 10 for production-coated particles. FIG. 1B is an enlarged view of a portion of FIG. 1A. Silicon-coated particles can be grown by pyrolytic decomposition of a silicon-bearing gas within reactor chamber 15 and deposition of silicon onto particles within a fluidized bed. In certain embodiments, the illustrated reactor 10 can be particularly well suited for silicon production by the pyrolytic decomposition of silane. Initially the deposition is onto small seed particles. Deposition can continue until particles are grown to a selected size appropriate for commercial use, whereupon the grown particles are harvested.

Seed particles may have any desired composition that is suitable for coating with silicon. Suitable compositions are those that do not melt or vaporize, and do not decompose or undergo a chemical reaction under the conditions present in the reactor chamber. Examples of suitable seed particle compositions include, but are not limited to, silicon, silica, graphite, and quartz. Seed particles may have any desired morphology. For example, the seed particles may be spheres, elongated particles (e.g., rods, fibers), plates, prisms, or any other desired shape. Seed particles also may have an irregular morphology. In some examples, seed particles can have a diameter in the largest dimension of 0.1-0.8 mm, such as 0.2-0.7 mm or 0.2-0.4 mm.

The illustrated embodiment can include a central inlet nozzle 20 for injection of a primary gas (also referred to as a precursor gas) through a central passageway 22 and a secondary gas through an annular passageway 24 surrounding the central passageway 22. Some systems may include a plurality of inlet nozzles (not shown). The primary gas can be silicon-bearing gas or a mixture of silicon-bearing gas, hydrogen and/or an inert gas (e.g., helium, argon). The primary gas also may include a halogen-containing gas. In certain embodiments, the secondary gas may have substantially the same composition as the hydrogen and/or inert gas in the primary gas mixture. In particular arrangements, the primary gas is a mixture of silane and hydrogen, and the secondary gas is hydrogen.

In another system (not shown), a primary gas nozzle is provided for injection of the silane. Surrounding the primary gas nozzle is a plurality of secondary gas nozzles. Typically, six secondary gas nozzles are arranged in an array surrounding and spaced laterally from the primary gas nozzle. In some systems (not shown), the reactor includes a plurality of silane nozzles, e.g., three silane nozzles with each silane nozzle surrounded by six secondary gas nozzles. In such systems, the plurality of silane nozzles typically are arranged in an array surrounding and spaced laterally from a central location within the reactor; in certain systems, one of the silane nozzles may be positioned at the central location.

The reactor 10 extends generally vertically, has a central axis $A_1$, and may have cross-sectional dimensions that are different at different elevations. The reactor shown in FIG. 1 has five regions I-V of differing cross-sectional dimensions at various elevations. The reaction chamber may be defined by walls of different cross-sectional dimensions, which may cause the upward flow of gas through the reactor to be at different velocities at different elevations.

Reactor 10 further includes a plurality of fluidization gas nozzles 40. Additional hydrogen and/or inert gas can be delivered into the reactor through the fluidization nozzles 40 to provide sufficient gas flow to fluidize the particles within the reactor bed. In operation, the fluidized bed can be maintained in regions III-IV. The flow rate through the fluidization nozzles 40 can be adjusted to maintain the profile of the bed as the mean particle diameter of the silicon-coated particles changes and/or the fluidization conditions change. The fluidization gas typically has substantially the same composition as the non-silicon-bearing gas in the primary gas mixture.

Also provided are a sample nozzle 50 through which product is sampled and one or more pressure nozzles 60 for monitoring pressure within the reactor, which nozzles are laterally displaced from the central inlet nozzle 20. One or more purge gas/cooling gas nozzles 70, 72 are located below the fluidization nozzles 40 and extend radially through outer wall 80 and into the reactor 10.

The reactor 10 further includes one or more heaters 100 positioned inwardly of outer wall 80 in region IV. In some systems, heaters 100 are radiant heaters. The reactor 10 also may include an internal bed heater 90.

At the outset of production and during normal operations, seed particles are introduced into reactor 10 through a seed nozzle 110. Silicon-coated particles of a size distribution with an average diameter of approximately 1 mm are harvested by removal from reactor 10 through one or more product outlets 120. Outlet(s) 120 can comprise surfaces coated with silicon carbide or another non-contaminating liner/coating material to prevent surface contamination of passing silicon-coated particles.

A layer of insulation 130 (FIG. 1B) is positioned along the inner surface of outer wall 80. A removable, concentric liner 140 extends vertically along the axis $A_1$ through regions II-V of the reactor 10. The illustrated liner is generally cylindrical, having a generally circular cross-section. A removable sleeve 150 can be positioned proximate the inner surface of the liner 140. An expansion joint system includes a liner expansion device 160 that extends upwardly from the upper surface of the liner 140. Liner expansion device 160 can compress to allow for thermal expansion of the liner 140 during operation of the reactor 10. A second expansion joint system includes a sleeve expansion device 165 that extends upwardly from the upper surface of the sleeve 150. The sleeve expansion device 165 can compress to allow for thermal expansion of the sleeve 160 during operation of reactor 10.

The illustrated liner 140 and the sleeve 150 can be generally cylindrical, have a generally circular horizontal cross-section, can extend generally vertically through regions II-V, and can define a reaction zone. The reactor 10 is charged with seed particles through seed nozzle 110. The quantity of seed particles may vary based upon the dimensions of the reactor. For example, a reactor having a height of 6-9 meters and a reaction zone diameter of 40-50 cm may be charged with 800-1000 kg of silicon seed particles.

In certain embodiments, a silicon carbide coating or a coating of other material that does not add contamination to the final product can be provided on all surfaces that come into contact with silicon-coated particles to prevent surface contamination.

Insulation layer 130 thermally insulates outer wall 80 from radiant heaters 100. Insulation layer 130 additionally may reflect heat back to the liner 140 for improved heat transfer. In some systems, the insulation layer 130 can keep the external temperature of outer wall 80 to less than 95° C. (200° F.), and advantageously to less than 65° C. (150° F.), thus producing a "cold wall" reactor.

Figure 2:
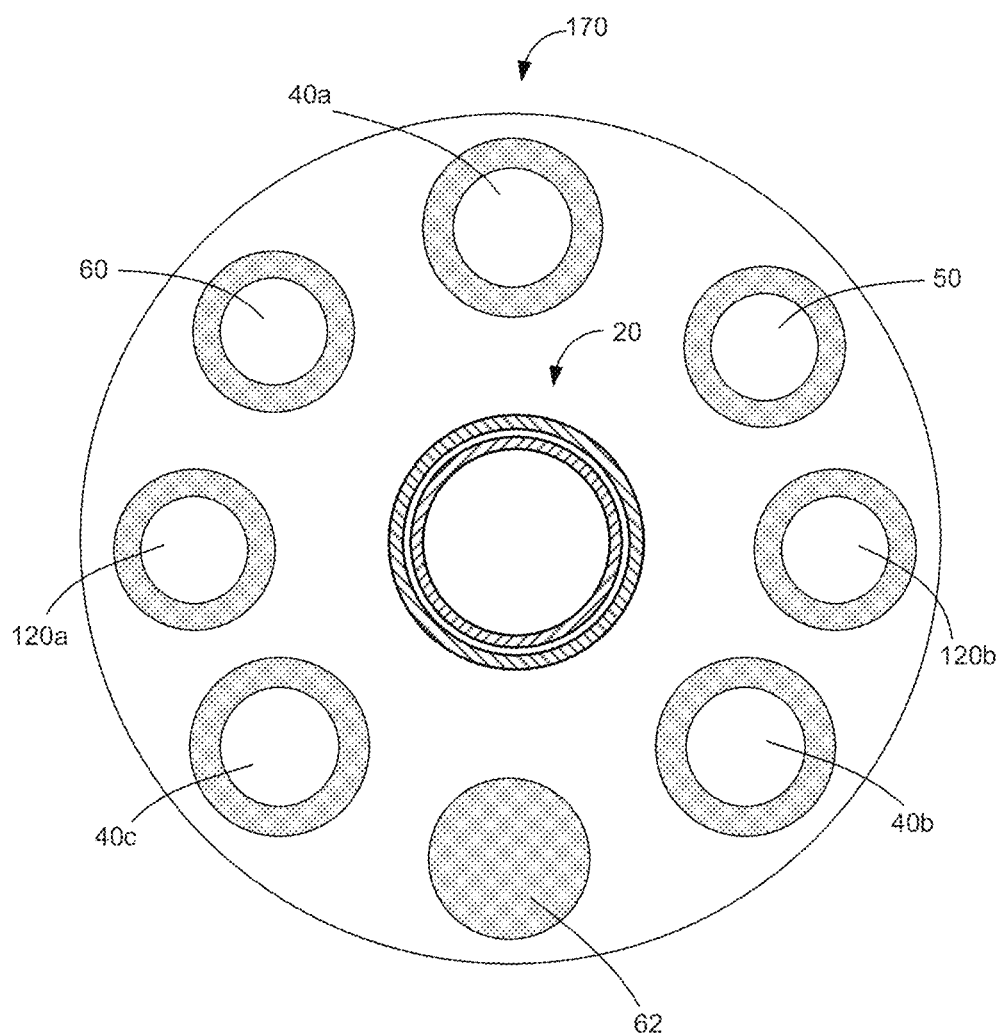
FIG. 2 is a schematic cross-sectional view taken along line 2-2 of FIG. 1, depicting the bottom head of the reactor.

FIG. 2 is a schematic cross-sectional view of one system of a bottom head 170. In the system shown, three fluidization nozzles 40a-c surround and are laterally/radially displaced from the central inlet nozzle 20. Two product withdrawal outlets 120a-120b, a sample nozzle 50, a pressure nozzle 60, and a thermowell 62 also are laterally/radially displaced from and surround the central inlet nozzle 20. Other systems may include more than one primary gas nozzle, each primary gas nozzle surrounded by a plurality of secondary gas nozzles. For example, there may be three primary gas nozzles, each surrounded by six secondary gas nozzles. Additional fluidization nozzles also may be included. Furthermore, there may be only one withdrawal outlet, or there may be more than two withdrawal outlets.

Referring to FIGS. 1A, 1B, and 2, a plurality of elevated fluidization nozzles 40 (e.g., nozzles 40a-40c shown in FIG. 2) can be arranged in a circular array that is located concentrically around central inlet nozzle 20.

In operation, a bed of seed particles is provided inside the reactor and is fluidized by gas injected through the central inlet nozzle 20 and the supplemental fluidization nozzles 40. The contents of the reactor chamber are heated by the optional internal bed heater 90 and the radiant heaters 100.

The temperature within reactor 10 can differ in various portions of the reactor. For example, with reference to FIG. 1A, when operating with silane as the silicon-containing compound from which silicon is to be released, the temperature in region I, i.e., the bottom zone, is 50-100° C. In region II, i.e., the cooling zone, the temperature typically ranges from 50-700° C. In region III, the intermediate zone, the temperature can be substantially the same as in region IV. The central portion of region IV, i.e., the reaction and splash zone, can be maintained at 620-760° C., and advantageously at 660-670° C., with the temperature increasing to 700-900° C. near the walls of region IV, i.e., the radiant zone. The upper portion of region V, i.e., the quench zone, has a temperature of 400-450° C.

The lower parts of the reactor can be maintained at a cooler temperature to minimize or prevent premature decomposition of the silicon-bearing gas within the central inlet nozzle 20. Premature decomposition can result in fouling and plugging of nozzle 20. Accordingly, the silicon-bearing gas temperature within the nozzle is maintained below that of decomposition and silicon deposition. For example, when the silicon-bearing gas is silane, the temperature within the nozzle can be maintained below 150° C. The higher temperatures within region IV enable pyrolytic decomposition of the silicon-bearing gas and subsequent silicon deposition on the seed particles.

In particular arrangements, the central inlet nozzle 20 can comprise two substantially cylindrical tubes that are substantially circular in cross-section, as shown in FIG. 2. In operation, a flow of primary gas can pass through the center region or passageway of nozzle 20, and a secondary gas can be introduced concentrically around the outlet of the central passageway. Further details of the inlet nozzle 20 can be found in U.S. Pat. No. 8,075,692, which is incorporated herein by reference.

Cooling gas at ambient temperature can be introduced into the chamber 15 through cooling gas nozzles 70, 72. Cooling gas nozzles 70, 72 are positioned in region II above bottom head 170 and below the sleeve 150 and liner 140 arrangement. The cooling gas and fluidization gas typically have substantially the same composition as the hydrogen and/or inert gas that is mixed with the silicon-bearing gas in nozzle 20. Introduction of the cooling gas below the fluidization nozzles 40 can provide a countercurrent flow of the cooling gas and product solids, resulting in cooling of the product solids prior to withdrawal through outlet 120 and preheating of the cooling gas before it flows into region IV of the reactor 10. The reactor diameter, cooling gas flow rate, and/or cooling region height can be selected to prevent fluidization in the cooling zone, which can promote mixing and heat the cooling zone to an unacceptable temperature. For example, the cooling gas may have a flow rate of 230-310 slm (standard liters per minute) when the cooling zone (region II) has an inner diameter of 45 cm. The countercurrent flow of the cooling gas can carry fine particles back up to the fluidized zone for further reaction and silicon deposition.

EXAMPLE 2

Pressure-Based Particle Size Control of Fluidized Bed Reactor

The bulk flow properties of a fluidized particle bed can depend upon a variety of parameters such as gas composition (including chemical species, viscosity, etc.), gas density, gas superficial velocity (a ratio of the volume flow rate of the gas phase, which can be dependent upon temperature, and the cross-sectional area of the flow channel), the reactor geometry, and/or seed particle properties such as density and particle size distribution. In certain embodiments, variables such as the gas species, reactor temperature, and gas flow rate(s) can be held constant, or relatively constant, during steady state operation. The properties of other inputs such as seed particle size and density can be preselected. Physical parameters of the system such as reactor geometry can be assumed to be relatively constant, at least when operating within a selected operating or temperature range.

Figure 3:
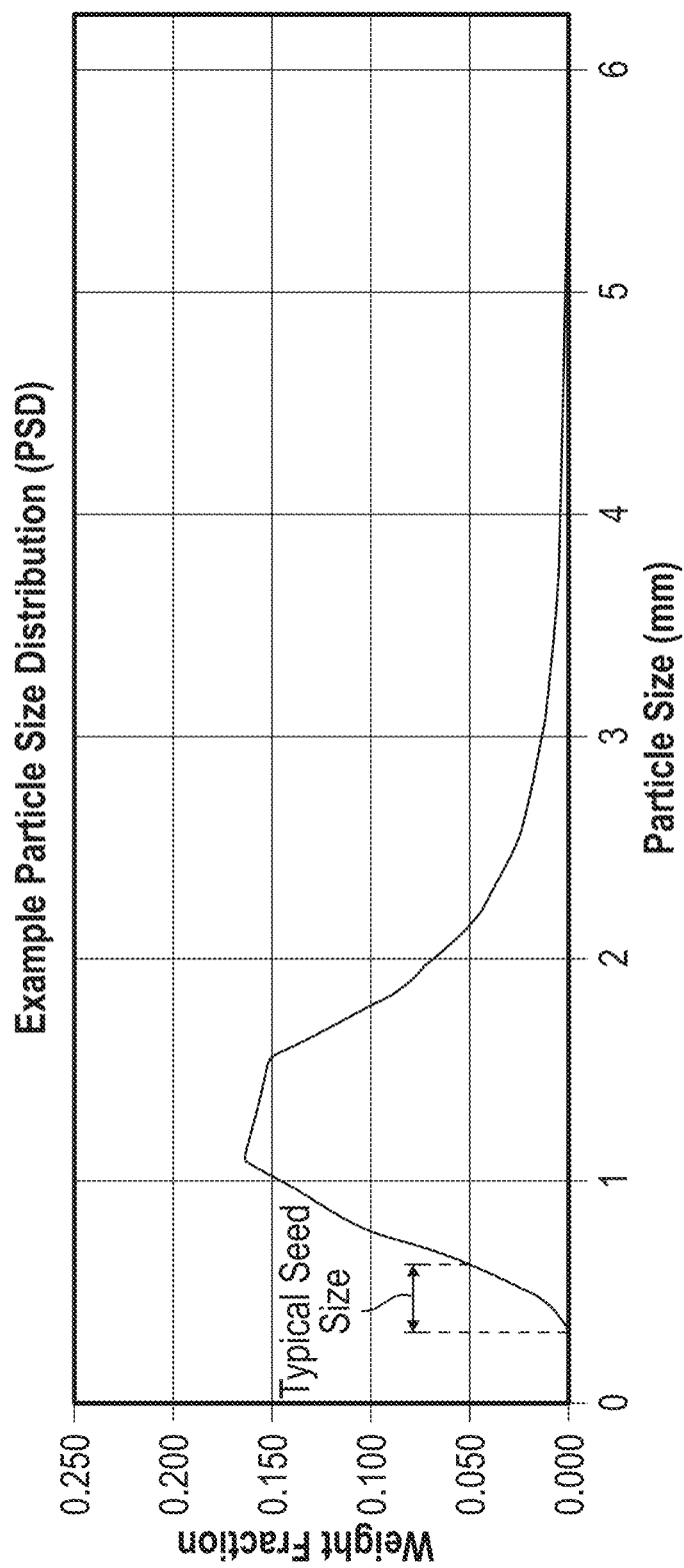
FIG. 3 is a graph illustrating the particle size distribution in a representative embodiment of a fluidized bed reactor producing polysilicon.

Thus, during steady state operation, the bulk flow properties of the fluidized bed may be influenced particularly by changes in the particle size distribution of the seed particles as material is deposited on them by decomposition of the precursor gas. In particular embodiments, seed particles having a mean particle size of 0.1 mm to 0.8 mm, such as 0.4 mm to 0.7 mm, may be introduced into the reactor 10 (see FIG. 5). As material (e.g., silicon) is deposited on the particles, the particles grow in size. FIG. 3 illustrates a representative example of the particle size distribution which may be found in any of the polysilicon-producing FBR systems described herein during steady state operation. In particular, FIG. 3 illustrates the weight fraction of particles in the bed as a function of particle size. For example, in certain embodiments the particle size can range from 0.1 mm to up to 6 mm or more, with the majority of the particles ranging in size from 0.5 mm to 3 mm.

Figure 5:
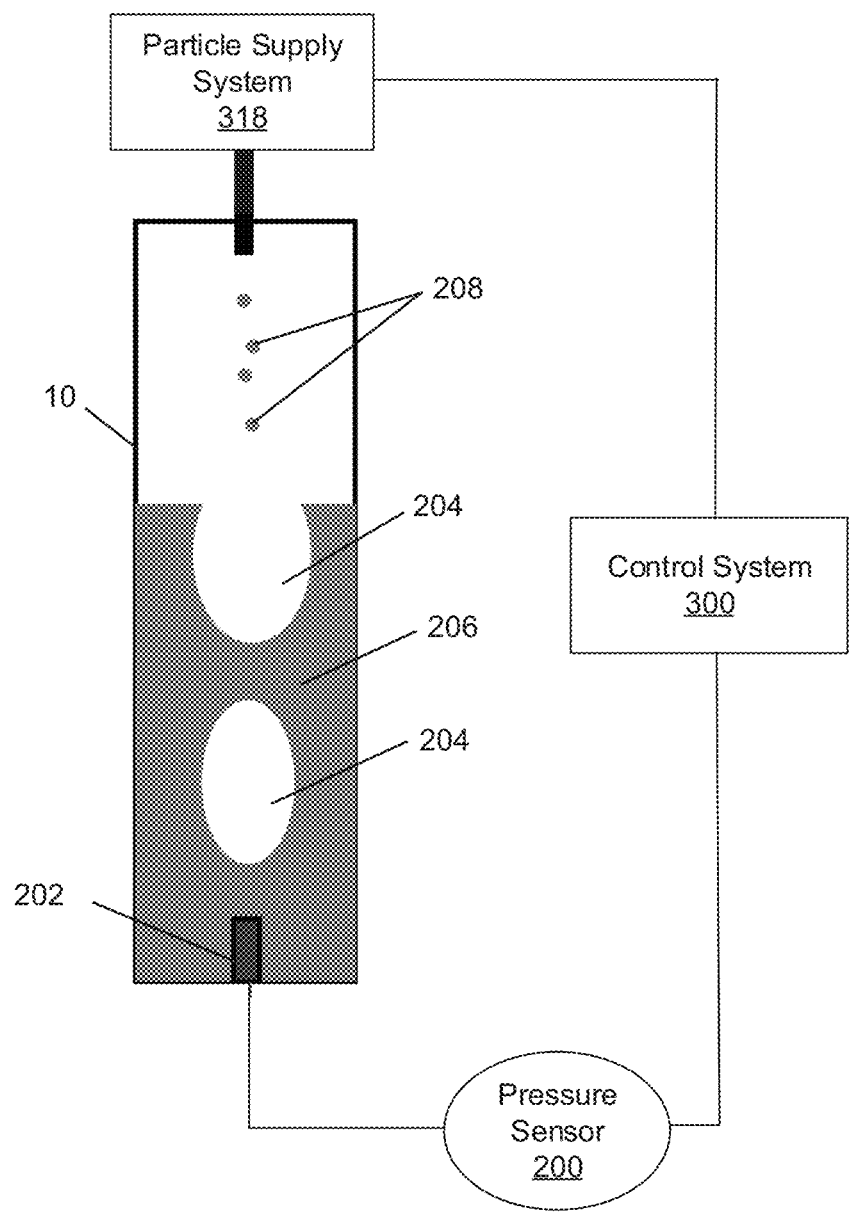
FIG. 5 is a schematic diagram of a fluidized bed reactor system including a pressure sensor and a control system, according to one embodiment.

As the mean particle size and/or mass increases, the bulk flow behavior of the particles can change as other variables noted above are held constant. For example, in examples of polysilicon production in which the mean particle size of the seed particles falls within the ranges noted above, the seed particles may exhibit fluidization behavior associated primarily with Geldart Group D (e.g., particle size greater than 600 µm, at least for particles with density similar to silicon). Fluidization of such particles may be characterized by the formation of relatively large gas bubbles within the particle bed. For example, gas bubbles in the fluidized bed may extend across a large portion of the diameter, for example 40%, 50%, 60%, 70%, 80%, 90% of the diameter, across the entire diameter, or substantially the entire diameter, of the reactor at the level of the reaction zone IV. FIG. 5 schematically illustrates gas bubbles 204 moving upwardly through a particle bed 206. Depending upon the particular parameters of the system, such gas bubbles may emerge, erupt, or spout from the bed surface substantially one at a time.

Figure 4:
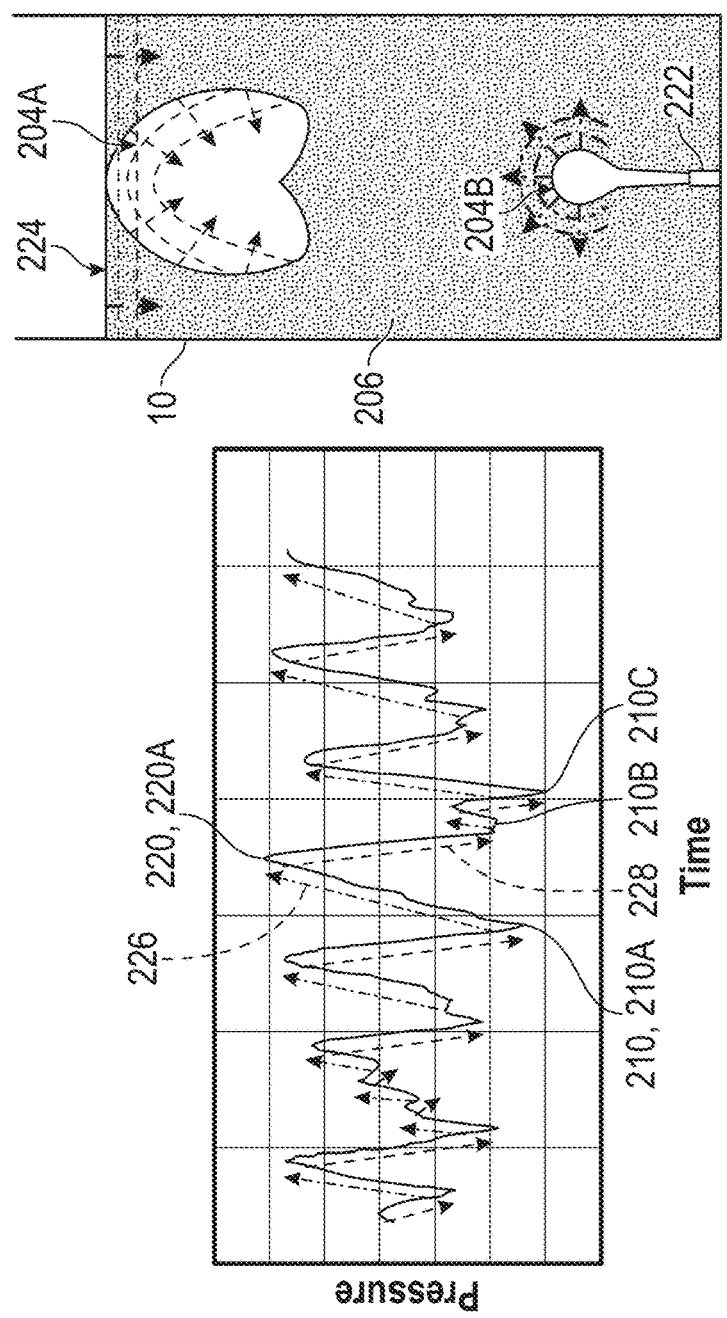
FIG. 4A is a schematic diagram of a fluidized bed reactor system illustrating the increase in bed height during formation of a gas bubble in the fluidized bed.
FIG. 4B is a graph illustrating pressure fluctuations in a fluidized bed reactor correlated with the formation and eruption of gas bubbles from the fluidized bed.
FIG. 4C is a schematic diagram illustrating the eruption of a gas bubble from a fluidized bed and a decrease in bed height.

For example, FIG. 4A schematically illustrates the formation of a gas bubble/pocket 204A (e.g., precursor gas such silane gas, and/or fluidization gas) above a gas nozzle 222 in a fluidized bed 206 contained in the reactor 10. FIG. 4C illustrates the eruption or bursting of the gas bubble 204A through the surface 224 of the fluidized bed 206, and FIG. 4B illustrates a representative example of the pressure in the reactor vessel 10 over a selected time period when the reactor is in steady state operation and the particle bed 206 is at least partially fluidized.

Referring to FIG. 4B, the pressure in the reactor vessel 10 can fluctuate between pressure minimums 210 and pressure maximums 220. The pressure maximums 220 can correspond to the eruption or bursting of a gas bubble or pocket (such as the bubble 204A) from the surface of the fluidized bed. The pressure minimums 210 can correspond to the relative settling or compaction of the material bed prior to or during the early stages of the formation of a new gas bubble (e.g., at or near the location of the gas nozzles). For example, beginning at a representative pressure minimum 210A in FIG. 4B and moving in a direction along the positive x-axis (increasing time), as the bubble 204A (FIG. 4A) forms and moves upwardly through the fluidized bed 206, the pressure in the reactor vessel can increase, as shown in FIG. 4B. During this time, the surface 224 of the fluidized bed 206 can also rise relative to the walls of the reactor vessel 10, as shown in FIG. 4A. The dashed line arrows in FIG. 4B correspond to the direction of motion of the surface 224 of the fluidized bed over the corresponding time interval. Thus, as indicated by arrow 226 in FIG. 4B, as the bubble 204A forms and rises through the bed, the bed surface 224 can rise. Referring to FIG. 4C, when the gas bubble 204A emerges or breaks through the bed surface 224, the level of the bed surface 224 can fall as the fluidized bed compacts, densifies, or deflates. This is also indicated by arrow 228 in FIG. 4B. During this period, the pressure in the reactor vessel can also fall from the maximum 220A to a minimum 210B.

In certain examples, as the particle size increases (e.g., due to material deposition), the size of gas bubbles in the bed may decrease. Such changes in the bulk flow, mixing, or fluidization properties of the particles can be detected by measuring/monitoring pressure fluctuations (e.g., timing and/or amplitude) in the reactor vessel. For example, relatively lower amplitude pressure fluctuations in the reactor vessel can be indicative of a larger particle size distribution or average particle size. Higher amplitude pressure fluctuations can be indicative of larger gas bubble formation associated with a smaller particle size distribution and/or a reduced mean particle size. Shorter time intervals between pressure maximums and/or minimums, lower amplitude pressure fluctuations, or combinations thereof can also be indicative of relatively small gas bubbles and relatively larger particle size.

In certain embodiments, the system can comprise one or more sensor elements configured to determine the pressure inside the reactor vessel 10. The sensor elements can be configured as pressure transducers or other sensors, and can be in fluid communication with the interior of the reactor 10 by a pressure tap or other communication through the wall of the reactor. For example, FIG. 5 illustrates a pressure sensor or transducer 200 in fluid communication with a pressure tap configured as a conduit 202 located inside the reactor vessel 10 and extending upwardly from the bottom of the reactor vessel (e.g., at or near the level of the nozzle 222 in FIGS. 4A and 4C). In certain embodiments, the conduit 202 can be the pressure nozzle 60 shown in FIG. 1, or another conduit or aperture through which the pressure of the gases in the reactor vessel can be sampled. In certain embodiments, the conduit 202 can be located at or near the elevation of the nozzle 20 in FIGS. 1A-1B and 2. The pressure sensor 200 can provide data of the pressure (e.g., static pressure) inside the reactor vessel 10 to a control system 300, which can determine the timing, rate, and/or quantity of particle additions to the particle bed 206, as described in greater detail below. In yet other embodiments, the pressure transducer can measure the feed pressure of a gas entering the reactor (e.g., through any of the nozzles, such as the nozzle 20 of FIGS. 1A-1B and 2). In such embodiments, pressure drop downstream of the measurement before the gas reaches the fluidized bed, such as at a nozzle orifice, may advantageously be low compared with the pressure changes to be measured so as not to obscure the pressure changes.

Referring again to FIG. 1A, the reactor 10 may comprise three distinct pressure regions or zones illustrated in FIG. 1A as pressure zone A, pressure zone B, and pressure zone C. The first pressure zone A can extend from the bottom of zone I, through zones II and III. Pressure zone B can extend into at least a portion of zone IV (e.g., from the outlet of the nozzle 20 and along at least a portion of the length of the silane gas plume 180 shown emerging from the nozzle 20). The third pressure zone C can extend upwardly through the remainder of the reaction zone IV. In the illustrated configuration, pressure zone A can be below the level in the bed at which introduced gas begins to form pockets or bubbles and, in some embodiments, below the level of gas jet formation. In certain embodiments, pressure measurements taken in pressure zone A are not in the fluidization zone, but in a relatively stagnant region that communicates with the fluidized bed. Thus, in certain embodiments, pressure measurements taken in pressure zone A can detect fluctuations associated with gas bubble formation, and the emergence of gas bubbles from the surface of the bed. This zone can be relatively free of pressure fluctuations due to modulation of gas jets, or gas bubbles flowing past the sensing instrument on the way to the bed surface. Pressure measurements taken in pressure zone C, at or above the level where gas bubbles form in the particle bed, may include noise associated with gas bubbles passing the sensor location.

Conditions in pressure zone B can be more similar to pressure zone A, or more similar to pressure zone C, depending upon reactor conditions. For example, in pressure zone B, bubbles or pulsating jets may or may not form depending on gas temperatures, gas composition, gas flows and particle size distribution, among other variables.

Because of this, in zone B, noise added to the pressure signal generated by passing bubbles or modulating gas jets may or may not be present.

Figure 6:
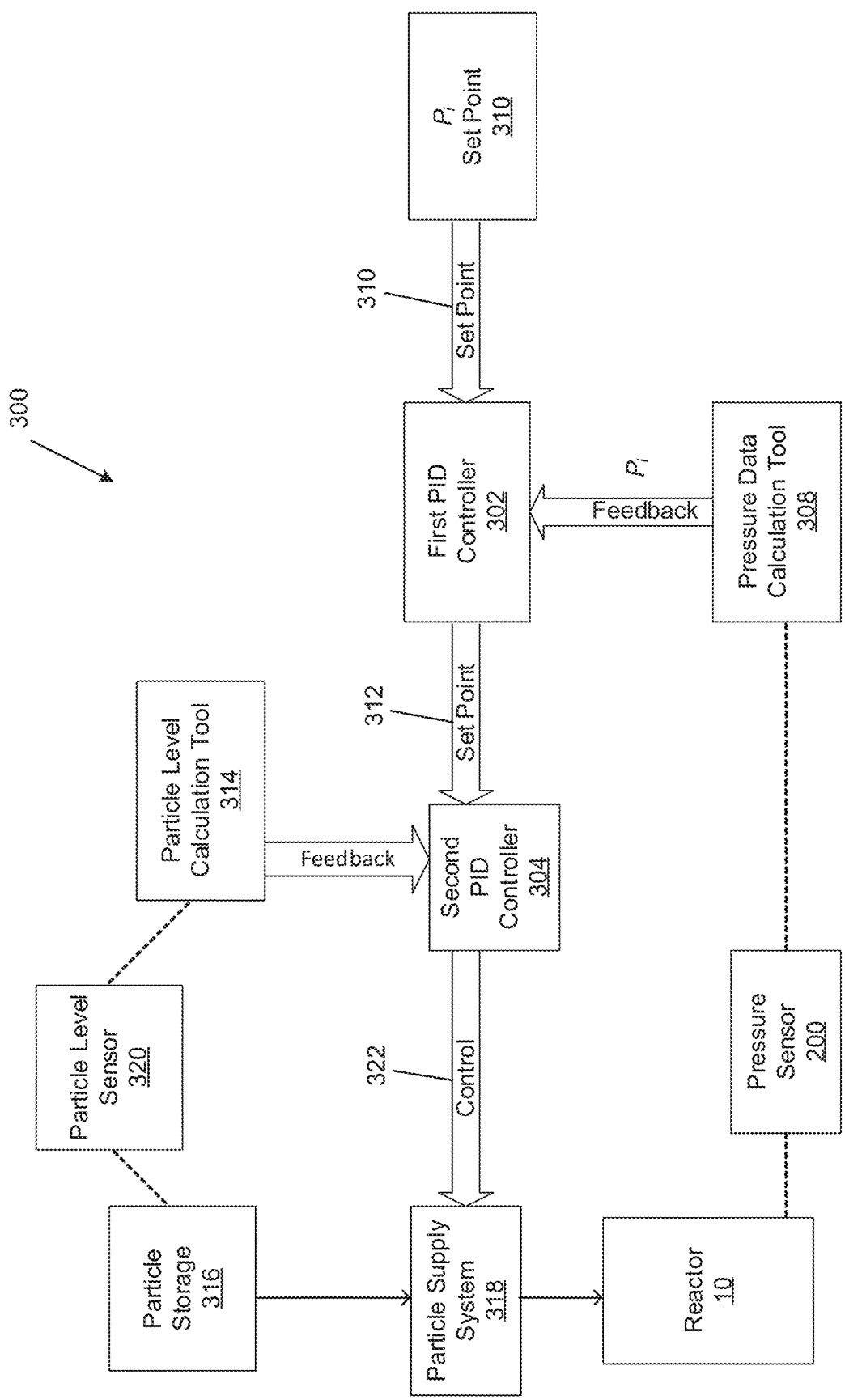
FIG. 6 is a schematic block diagram of a representative embodiment of a control system.

Pressure fluctuations such as those described above can be used to control the timing, rate, and/or quantity of seed particle additions and/or withdrawals to and from the reactor in order to maintain the particle size distribution within selected bounds. FIG. 6 illustrates a schematic diagram of a representative embodiment of a control system 300 for controlling additions of seed particles based at least in part on data of the pressure inside the reactor vessel. The control system 300 can include a first controller 302 (e.g., a fluidization controller) configured as a proportional-integral-derivative (PID) controller, and a second PID controller 304 (e.g., a particle feed controller) in communication with the first controller 302.

In operation, the pressure sensor or transducer 200, which can be in communication with the interior of the reactor vessel 10 (e.g., via the conduit 202 in FIG. 5) can determine a pressure inside the reactor. In other embodiments, the pressure sensor 200 can be located inside the reactor 10, and can transmit data of the pressure to the control system 300 by a wired or wireless connection. In another embodiment, the pressure sensor may be located in the gas stream feeding a nozzle communicating with the reactor bed. The pressure sensor 200 can measure the pressure (e.g., the amplitude of pressure fluctuations) in the reactor in the pressure zone A (as in the illustrated embodiment), in the pressure zone B, or in the pressure zone C. In other embodiments, multiple pressure sensors can measure the pressure in more than one of the pressure zones A, B, and/or C.

Data of the pressure measurements can be transmitted to a pressure data calculation tool 308. The tool 308 can calculate a pressure parameter $P_i$, which can be any of a variety of pressure-related variables or parameters indicative of the amplitude of the pressure fluctuations, such as pressure change or pressure range over a selected time period (e.g., the difference between a maximum pressure and a minimum pressure in the selected time period), a standard deviation of the pressure signal over a selected time period, a variance (e.g., the square of the standard deviation) of the pressure over a selected time period, the mean pressure over a selected time period, the frequency of pressure maximums, the frequency of pressure minimums, and/or any of a variety of other parameters related to the variation, range, percentile range, or spread of the pressure signal. The tool 308 can also calculate an absolute maximum pressure and an absolute minimum pressure, and/or an average or mean maximum pressure and a mean minimum pressure in the selected time period. If pressure is measured in pressure zone B and/or zone C, the pressure data calculation tool 308 can perform additional operations and/or signal processing steps on the signal to account for pressure fluctuations due to gas passing the pressure tap location (e.g., by filtering such fluctuations to isolate signals associated with gas bubbles forming and emerging from the surface of the fluidized bed, as described above).

The first controller 302 can receive information of the pressure parameter(s) $P_i$ from the pressure data calculation tool 308. The first controller 302 can also receive a first specified threshold or set point 310. In certain embodiments, the set point 310 can be a target value for any of the pressure parameters $P_i$ identified herein, such as an average pressure variation or pressure range over a selected period of time, a standard deviation of the pressure measured over a selected period of time, etc. The controller 302 can compare the pressure parameter $P_i$ received from the tool 308 with the set point 310. If the pressure parameter $P_i$ is different from the specified set point value 310, the controller 302 can determine an amount (e.g., weight, volume, number, etc.) of seed particles or a rate of addition of needed to return the pressure parameter to the set point 310, and can output the amount or rate of seed particle addition as a set point 312 to the second controller 304. In certain embodiments, the set point 312 can be a mass flow rate or a volume flow rate of seed particles. In certain embodiments, the mass or volume flow rate can be calculated to maintain the particle size distribution as a log-normal distribution with a mode particle diameter of substantially 1 mm (e.g., 0.5 mm to 1.5 mm).

In addition to the set point 312, the second controller 304 can also receive feedback data of a level or amount of seed particles in a seed particle storage 316. The seed particle storage 316 can be in communication with the reactor vessel 10 by a particle supply or metering system 318, which can be configured to selectively dispense particles from the storage 316 into the reactor 10. A particle level sensor 320 can determine the amount of seed particles in the particle storage 316, and provide the amount to a particle level calculation tool 314. In certain embodiments, the particle level sensor 320 can measure a height of particles in the storage 316 (which can be, for example, a hopper), a weight of the particles in the storage 316, a volume of the particles in the storage 316, and/or any combination thereof. The particle level calculation tool 314 can calculate an amount of seed particles in the storage 316 based on the data provided by the sensor 320.

Based at least in part on the set point 312 and the feedback data from the particle level calculation tool 314, the controller 304 can output/transmit control signals 322 to control or change the rate at which seed particles are supplied to the reactor, for example, by actuating the particle supply system 318. The particle supply system 318 can include a valve or other flow control device, which can be opened to dispense particles 208 to the fluidized bed reactor, as shown in FIG. 5. Thus, the controller 304 can output/transmit control signals to add seed particles, increase the rate of addition of seed particles, maintain a rate of seed particle addition, decrease the rate of addition of seed particles, or stop the addition of seed particles (e.g., based on the set point 312). The seed particle addition(s) (e.g., through the nozzle 110 in FIG. 1A) can be discrete or continuous, variable or time invariant, periodic or aperiodic, or any combination thereof. Pressure data can be collected by the pressure sensor 200, and the process can be repeated as necessary to operate the reactor 10 such that the particles in the fluidized bed remain within a selected particle size distribution range (e.g., as shown in FIG. 3). Further, although the illustrated embodiment includes two controllers 302 and 304, in other embodiments the functions described above may be performed by a single controller or computing device.

In a representative example, where the graph in FIG. 4B represents pressure data provided by the pressure sensor 200 over a selected time period, the pressure data calculation tool 308 can calculate a pressure parameter $P_i$ indicative of the amplitudes of the pressure fluctuations in the selected time period, such as the pressure range over the time period (e.g., the difference between the maximum pressure 220A over the time period and the minimum pressure 210C over the time period in FIG. 4B). The pressure data calculation tool 308 can also calculate an average maximum pressure over the time period based on the pressure maximums 220 in FIG. 4B, and/or an average minimum pressure over the time period based on the pressure minimums 210. In embodiments in which the average maximum pressure and the average minimum pressure are determined, the pressure data calculation tool 308 can determine a difference between the average maximum pressure and the average minimum pressure over the time period. The pressure data calculation tool 308 can also calculate the standard deviation of the pressure signal, the standard deviation of the pressure maximums and/or the pressure minimums, the variance of the pressure signal, the spread of the pressure signal, etc. Moving averages of such pressure parameters can also be determined over sequential time periods.

For example, in certain embodiments the pressure data calculation tool 308 can determine a moving average of any of the pressure parameters described herein, such as an exponentially-weighted moving average (EWMA). In certain embodiments, the moving average can be calculated using the equation below, where $P_i$ is the EWMA of a particular pressure parameter (e.g., range, standard deviation, maximum pressure amplitude, minimum pressure amplitude, difference between average maximum and average minimum pressure, variance, variation, etc.), i is the current/selected time period, i−1 is the previous time period, α is a weighting factor (e.g., 1% to 25%, such as 5% to 20% or 5% to 10%), and $\Delta P_i$ is the variation in the selected pressure parameter in the current/selected time period.

$$P_i = \alpha \times P_{i-1} + (1-a) \times \Delta P_i$$

In certain embodiments, the moving average of the pressure parameter $P_i$ can be determined using a first-order (or higher-order) infinite impulse response filter. The moving average of the selected pressure parameter can be determined based on the value of the pressure parameter in the current selected time period, and any number of earlier time periods, such as one earlier time period, two earlier time periods, three earlier time periods, etc.

Figure 7:
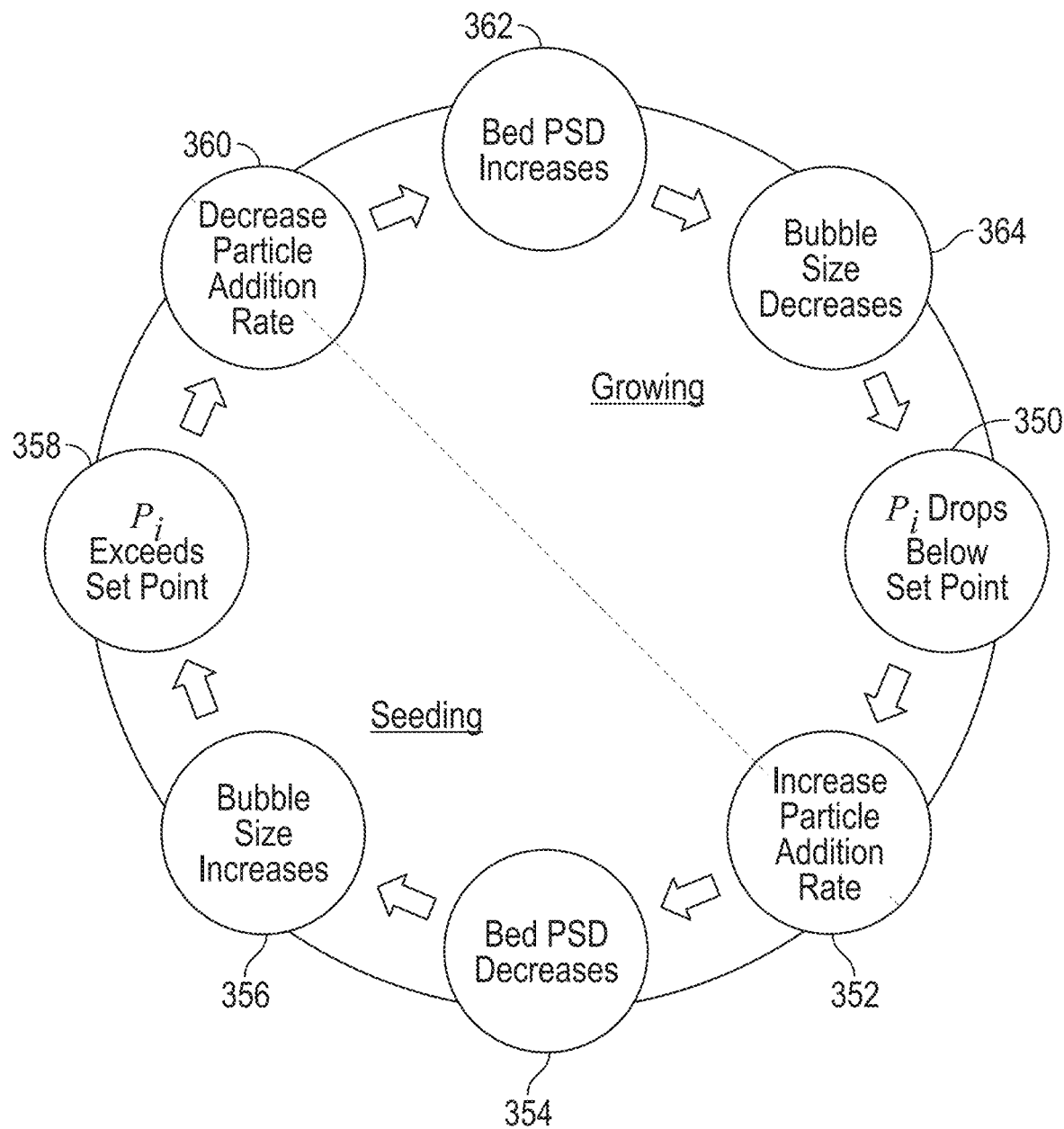
FIG. 7 is a process flow diagram illustrating control of particle additions to a fluidized bed reactor based on pressure fluctuations in the fluidized bed reactor, according to one embodiment.

In certain embodiments, the pressure parameter $P_i$ can be compared to the set point 310, and particle additions to the reactor 10 can be controlled based on the comparison, as described above. For example, FIG. 7 is a process flow diagram illustrating operation of the system, according to one embodiment. With reference to FIG. 7, in an exemplary and non-limiting embodiment in which the pressure parameter $P_i$ is, for example, a moving average of the pressure range over a plurality of sequential time periods, when the controller 302 determines that the pressure parameter $P_i$ has decreased below the set point 310 at block 350, the control system 300 transmits control signals to increase the rate of particle addition, or initiate particle addition at block 352. As particles are added to the fluidized bed, the particle size distribution (PSD) of the particle bed decreases as indicated at process block 354, resulting in an increase in the size of gas bubbles in the fluidized bed as indicated at block 356. As the pressure parameter $P_i$ increases with the increasing bubble size (and associated pressure amplitude fluctuations), the controller 302 can determine that the pressure parameter $P_i$ has exceeded the set point 310 at block 358, and can transmit control signals to decrease the particle addition rate, or cease the addition of particles at block 360. The particle size distribution of the particle bed can begin to increase at block 362, which can cause the bubble size to decrease as indicated at block 364. The pressure parameter $P_i$ can drop below the set point again, and the process can be repeated. Accordingly, moving clockwise around FIG. 7, in certain embodiments the particle size distribution can decrease as particles are added to the bed (known as "seeding") between process blocks 352 and 360, and the particle size distribution can increase as the particles grow in size between blocks 360 and 352.

In certain embodiments, the seed particle addition rate, quantity, etc., can be determined based on a difference between the pressure parameter $P_i$ and the set point 310. For example, the controller 302 can determine a difference between the pressure parameter $P_i$ and the set point 310, and can determine the set point 312 based at least in part on the difference (e.g., the magnitude or absolute value of the difference).

In certain embodiments, the controller 302 can process pressure data from selected time increments or time periods of 1 second, 5 seconds, 10 seconds, 30 seconds, one minute, two minutes, three minutes, five minutes, 10 minutes, 15 minutes, 20 minutes, etc. In particular embodiments, the time periods can be 10-15 minutes.

In certain embodiments, the moving average of the pressure parameter $P_i$ can be calculated based on a current or selected time period and at least one previous time period, such as two time periods, five time periods, 10 time periods, 20 time periods, 30 time periods, etc. The value of the pressure parameter $P_i$ of the current and/or previous time periods can be weighted, as described above, and the weighting given to a particular time period can be increased or decreased as data for subsequent time periods are acquired.

EXAMPLE 3

Fluidized Bed Reactor Including Spout Chamber

FIGS. 8-10 illustrate another embodiment of a fluidized bed reactor that can be operated using the control systems and methods described herein. FIG. 8 shows a multiple augmented submerged spout fluidized bed reactor vessel 410 for silicon production. The vessel defines a chamber that includes four regions from bottom (gas inlet) to top (gas and powder outlet). The lowest region is the spout chamber (I) where influent fluidizing gas enters through spout nozzles 418. The illustrated system has three spout nozzles that produce three parallel spouts 412 in a single spout chamber. Other configurations can employ one or more individually controlled parallel spouts in each of one or more separate spout chambers. A spout chamber 414 is defined by a wall 416 (FIG. 9) shaped to stabilize the spout circulation and includes a spout nozzle 418 surrounded by one or more secondary orifices 420. One or more product outlets 422 can be provided to withdraw larger particles that may accumulate at the bottom of the reactor through an outlet line 424. This product outlet line 424 can have a countercurrent gas flow 426 injected through gas supply line 427 (FIG. 8) to de-dust the product particles as they flow by gravity to product handling. The gas flow 426 best will comprise or consists essentially of or consist of halogen-containing gas, inert gas, or a mixture thereof. Higher velocities may be used to entrain smaller particles and recycle them back into the reactor.

Gas entering through the spout nozzle 418 creates a submerged spout circulation within the chamber 414 with a dilute upward flow (spout) 412 of gas and particles from the nozzle and a dense downward flow of particles in the annular region 428 surrounding the spout and limited by the chamber walls 416. Particles flowing down in the annulus 428 are entrained back into the gas moving upwardly from the nozzle 418 and thus reenter the spout 412 for another loop. A significant portion of the silicon-bearing gas conversion to silicon can take place in the spout region 414, mostly within the spout 412; and the silicon is either deposited onto the particles or converted to powder through nucleation or attrition.

The upper end of the spout chamber is at the beginning of the transition region (II). The top of each spout 430 disengages into this transition region (II). This is the region between the developed spout 412 below and a developed common fluidized bed zone above. The transition is located near the maximum spout height, estimated from correlations and verified in cold inert tests. The spout top 430 can be located in the transition region (II). The wall 432 which defines the region can be cylindrical or tapered or any combination thereof, but best results are achieved by employing some kind of a tapered expansion within the transition region. The taper can have a wide range of angles from vertical (0°) to abrupt (about 45°) but typically is to be around, or steeper than, the particulate angle of repose. If the angle is too small the expansion effect is limited while if the angle is too shallow, particles may settle and agglomerate on the transition walls 432.

The transition region (II) transfers the gas and powder to, and exchanges particles with, a dense fluidized bed region (III) above. The reactor wall in the fluidized bed region (III) is sized and shaped to contain beads in a bubbling fluidized bed. In particular, the area of the fluidized bed region is designed with a superficial velocity adequate to maintain a slow bubbling bed so that most of the particles are well mixed while larger particles segregate towards the bottom and enter the spouted bed through the transition. The objective is to maintain particles in a dense phase bubbling fluidized bed where dilute pockets of gas and particles, defined as the bubbles 440, flow upwardly and stir a dense continuum of particles and gas defined as the emulsion 442. The reduced gas velocity increases the gas residence time to allow for additional conversion of remaining silicon-bearing gas. The vigorous mixing caused by the bubbling action creates excellent contact between powder within the gas and the hot particles so they can capture powder by scavenging and annealing onto existing particles. Powder particles may also agglomerate onto themselves to form small particles which may serve as seed material. Both mechanisms are further enhanced by the deposition of silicon from unconverted silicon-bearing gas. There will also be some exchange of particles between the spout and the fluidized bed through regular mixing. Bubbles 440 coalesce and grow as they rise up through the bed. Depending on the desired bed height, there may be one or more additional tapered expansions within the bed region to further reduce the upper fluidization velocity. A sufficient total flow of gas should be maintained through spout nozzles and secondary orifices to fluidize particles above spout in the bubbling fluidized bed. But there can be several ports 444 through the vessel wall in the fluidized bed region. Additional gases may be added through these ports to the fluidized bed region to provide heat or extra fluidization or to promote attrition for self-seeding. Ports can also be used to recycle small particles or agglomerated powder for seed, introduce special instrumentation or possibly to withdraw product of a different particle size distribution than the product outlet 422 in the spout chamber. If needed, internals can be added to this region to promote smoother fluidization and add extra heating surface.

The bubbles 440 release from the fluidized bed into the dilute freeboard region (IV), where small particles may exit the bed (III) with the gas but larger particles disengage and fall back into the bed. Small particles or powder with terminal velocity smaller than the gas velocity can be entrained out with the exiting gas. There are several ports in the freeboard region as well. The two major ports are particle feed port 446 and gas outlet 448. The particle feed port best is located above the splash zone, and the gas outlet best is located above the Transport Disengagement Height, a height where entrainment is stable. As in the fluidized bed region (III) other ports 444 could be added, for example to recycle small particles or add instrumentation.

The three regions above the spout chamber, regions (II), (III), and (IV), are collectively referred to herein as the "upper bed region."

The vessel 410, and other vessels described herein, can be constructed in any material that is acceptable within the expected pressure, temperature and stress requirements or other construction constraints. The vessel could be made in a material having a high silicon content, for example high temperature quartz. Alternatively the vessel structure could be constructed in high temperature metal alloys such as, but not limited to, Incoloy® and Hastalloy™ alloys. The inner vessel wall 450 may or may not be lined, in parts, with a material that tolerates the operating temperatures and protects the silicon particles from contacting the structural vessel wall. Such a liner could be any material high in silicon such, as but not limited to, mono and polycrystalline silicon (Si), silicon carbide (SiC), silicon carbide coated graphite (C), silica ($SiO_2$) and silicon nitride (SiN). Other non-silicon materials include, but are not limited to, tungsten carbide (WC) and molybdenum (Mo). The primary purpose of this inner lining is to provide a non-contaminating surface facing the silicon particles within the vessel or regions of the vessel, mostly within regions (I) to (III) where the density of particles is highest.

Heat is typically added to the reactor by heating the inner wall 450 of the reactor in any region with, for example, resistance wall heaters 452. Other methods are also possible, such as but not limited to, preheating gases entering the reactor, microwave heating of gases or portions of the reactor, radiation heating or chemical reaction heating. To keep the added energy within the reactor, it should be surrounded with insulation 454.

FIG. 9 illustrates spout chamber details. Silicon-bearing gas, halogen-containing gas, inert gases, or any mixture thereof, enter the reactor through the vertical spout nozzles 418 at flow rates sufficient to create the characteristic spouted circulation pattern within the spout chamber 414. The circulation pattern is characterized by a dilute mix of gas and particles flowing upwards from the nozzle 418 in the spouting chamber 414. This is the spout 412 and is different from a fluidized bed distributor jet in that it is narrow and elongated without the characteristic fan shape of a jet. Furthermore, a spout may be continuous and stable without the fluctuations typical of a distributor jet. The submerged spout eventually collapses as it reaches the maximum height and disintegrates to enter the transition zone above. The dilute spout is surrounded by a concentric, annular, dense flow of particles 428 downwardly along the wall 416 of the spout chamber back to the spout entrance 418. The gas flow rate through the spout nozzle 418 is set to achieve a flow rate above the "minimum spouting velocity" while keeping the "maximum spout height" so the top of the spout 430 does not extend substantially past the end of the spout chamber to the transition region (II). Both minimum spouting velocity and maximum spout height are estimated from correlations in the spouted bed literature and verified in tests.

Further details of the reactor system of FIGS. 8-10 can be found in U.S. Publication No. 2008/0220166, which is incorporated herein by reference.

The reactor 410 may comprise three distinct pressure regions or zones A, B, and C, similar to the embodiment of FIG. 1A. The first pressure zone A can include the bottom of zone I, for example, from the bottom of zone I to midway along the spout 412. The second pressure zone B can include the top of zone I and the transition zone II. The third pressure zone C can be coextensive with zone III. As in the configurations described above, pressure zone A can be at or below the level in the bed at which introduced gas begins to form bubbles in the seed particle material. Thus, pressure measurements taken in pressure zone A can detect fluctuations associated with gas bubbles emerging from the surface of the bed, and can be relatively free of pressure fluctuations due to gas pockets or bubbles 440 flowing past the instrument. Pressure measurements taken in pressure zone C, at or above the level where gas bubbles form in the particle bed, may include noise associated with gas bubbles passing the sensor location. As with the embodiment of FIGS. 1A-2, pressure measurements made in pressure zone B may be similar to pressure measurements made in pressure zone C depending upon whether conditions in the reactor are such that jet modulation or bubble formation occurs in pressure zone B.

One or more pressure sensors can be positioned in pressure zone A and/or in pressure zones B or C. A control system similar to the system 300 illustrated in FIGS. 5 and 6 can control the rate of seed particle addition to the reactor vessel 410 based at least in part on pressure measurements in the reactor vessel, substantially as described above.

One or more of the control systems and methods described herein can provide significant advantages over existing methodologies for controlling the addition of particles in a fluidized bed reactor. For example, the systems and methods described herein can provide precise, short interval control of the particle size distribution in the reactor. The systems can also be more robust and less prone to failure, and require the input of fewer variables than existing systems. The disclosed systems and methods also require less specialized knowledge on the part of reactor operators than existing systems, making the systems easier to operate, modify, repair, and troubleshoot. The systems can also take advantage of pressure taps that may already be in use on existing reactors, and thus do not require extensive modifications in order to retrofit existing reactors.

EXAMPLE 4

Pressure-Based Control of Particle Additions to Fluidized Bed Reactor

Figure 11:
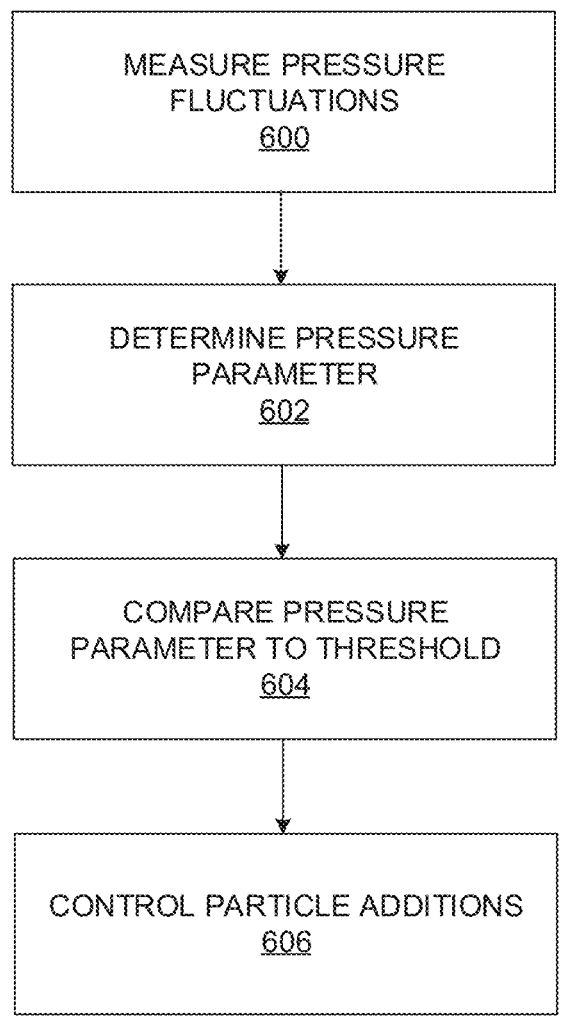
FIG. 11 is a process flow diagram illustrating a method of controlling particle additions to a fluidized bed reactor, according to one embodiment.

FIG. 11 is a process flow diagram illustrating a representative example of a method of controlling particle addition to a fluidized bed reactor based on a pressure parameter indicative of pressure fluctuations in the reactor. At process block 600, pressure fluctuations inside the fluidized bed reactor can be measured over a selected time period. At process block 602, a pressure parameter indicative of amplitudes of the pressure fluctuations can be determined. At process block 604, the pressure parameter can be compared to a specified threshold, and at process block 606 particle additions to the fluidized bed reactor can be controlled when the pressure parameter deviates from the specified threshold.

Figure 12:
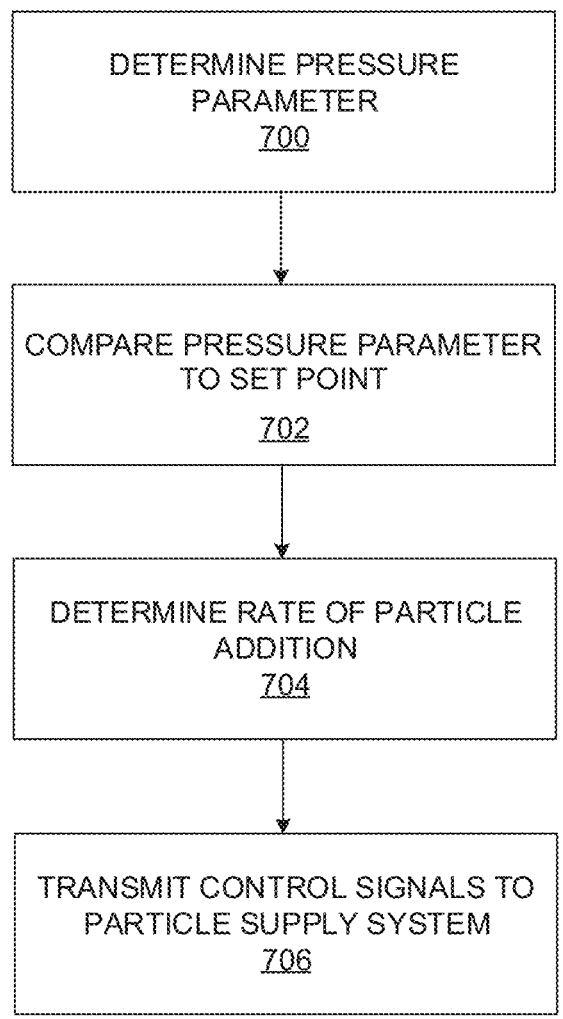
FIG. 12 is a process flow diagram illustrating a method of controlling particle additions to a fluidized bed reactor, according to another embodiment.

FIG. 12 is a process flow diagram illustrating another representative method of controlling particle addition to a fluidized bed reactor based on a pressure parameter indicative of pressure fluctuations in the reactor. At block 700, a pressure parameter indicative of amplitudes of pressure fluctuations in the fluidized bed reactor over a selected time period can be determined. At process block 702, a difference between the pressure parameter and a pressure parameter set point can be determined, and at block 704 a rate at which to add particles to the fluidized bed reactor can be determined based at least in part on the difference between the pressure parameter and the pressure parameter set point. At block 706, control signals can be transmitted to a particle supply system to supply particles to the fluidized bed reactor at the determined rate.

EXAMPLE 5

Pressure Wave Amplitudes

In another representative example, pressure variation (e.g., the pressure parameter $P_i$) is a measure of how much a pressure signal in a reactor changes over a given time interval. The time interval, for example, can be as short as one half of a pressure cycle (e.g., the time between local maximums and minimums in pressure). The time interval can also be lengthened to capture any number of pressure cycles in order to improve a statistical calculation of its variation to account, for example, for noise in the signal. In certain embodiments, this variation can be quantified by calculating a statistical value such as standard deviation, variance, range, percentile ranges, etc., or combinations thereof, using pressure data within the selected time interval.

Thus, in one example where a pressure wave has a maximum pressure of 6 psi and a minimum of 5 psi, the variation/range is 1 psi. If the maximum pressure increases to 6.5 psi and the minimum decreases to 4.5 psi, the variation/range increases to 2 psi. If the maximum is instead 5.5 psi and the minimum is 5 psi, the variation/range is 0.5 psi. In certain embodiments, if the signal is regular, then control can be implemented based on one maximum value and one minimum value. For less regular systems, more data (e.g., more maximums and minimums) can be collected for analysis. For time periods including multiple maximums and minimums, various methods and calculations can be used, such as a difference between an absolute maximum value and an absolute minimum over a period of time, an average maximum and an average minimum over a period of time, a standard deviation over a given time, a moving average of these parameters, etc.

EXAMPLE 6

Representative Computing Environment

Figure 13:
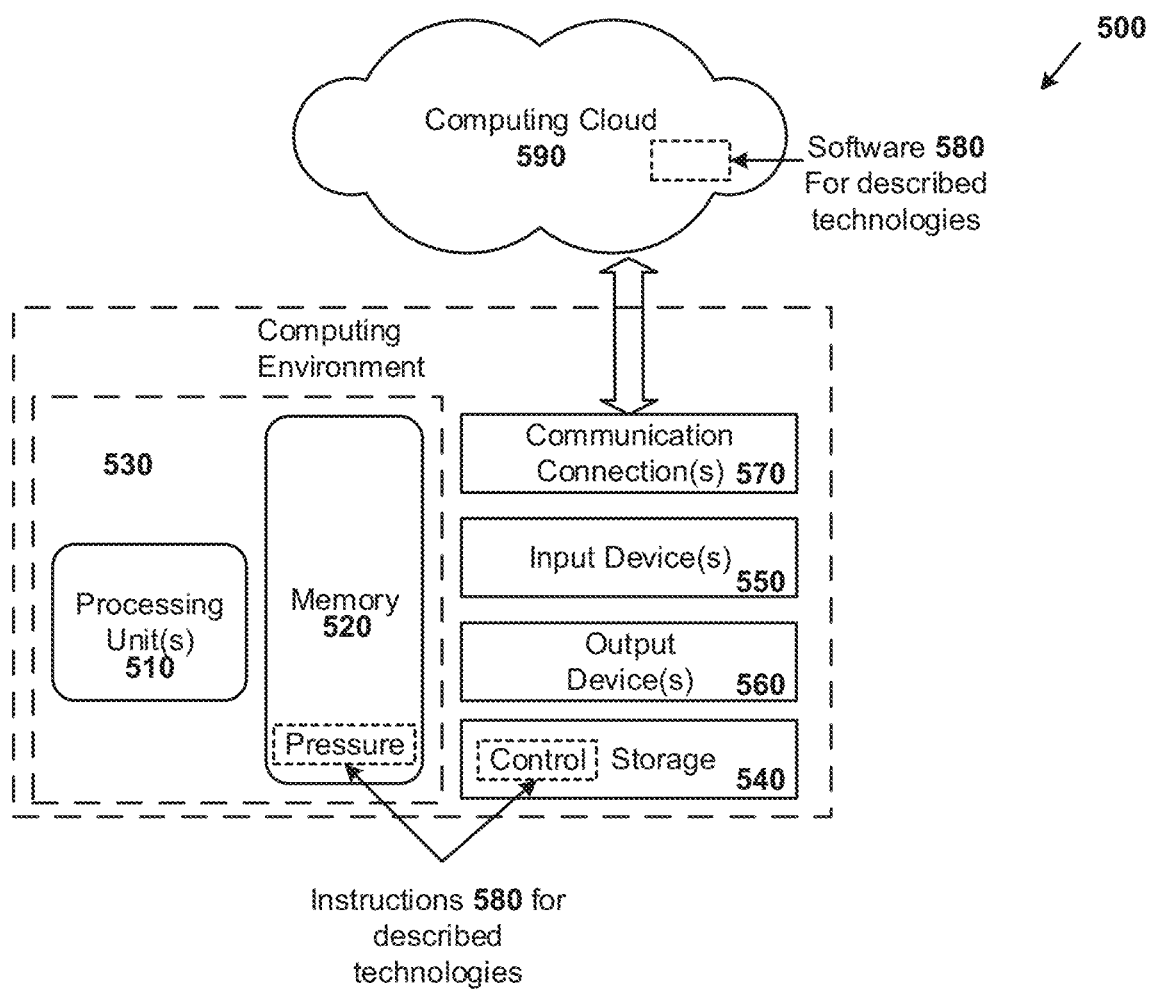
FIG. 13 is a schematic block diagram of a representative computing environment.

FIG. 13 illustrates a generalized example of a computing environment 500 in which software and control algorithms for the described embodiments can be implemented. For example, one or both of the controllers 302 and 304 can be configured similarly to the computing environment 500.

The computing environment 500 is not intended to suggest any limitation as to scope of use or functionality of the technology, as the technology may be implemented in diverse general-purpose or special-purpose computing environments. For example, the disclosed technology may be implemented with other computer system configurations, including programmable automation controllers, programmable logic controllers, application-specific integrated circuits (ASICs), field-programmable gate arrays (FPGAs), hand held devices, multi-processor systems, programmable consumer electronics, network PCs, minicomputers, and the like. The disclosed control methodology may also be practiced in distributed computing environments where tasks are performed by remote processing devices that are linked through a communications network. In a distributed computing environment, program modules may be located in both local and remote memory storage devices.

With reference to FIG. 13, the computing environment 500 includes at least one processing unit 510 and memory 520. In FIG. 13, this most basic configuration 530 is included within a dashed line. The processing unit 510 executes computer-executable instructions and may be a real or a virtual processor. In a multi-processing system, multiple processing units execute computer-executable instructions to increase processing power and as such, multiple processors can be running simultaneously. The memory 520 may be volatile memory (e.g., registers, cache, RAM), non-volatile memory (e.g., ROM, EEPROM, flash memory, etc.), or some combination of the two. The memory 520 stores software 580 that can, for example, implement the technologies described herein. A computing environment may have additional features. For example, the computing environment 500 includes storage 540, one or more input devices 550, one or more output devices 560, and one or more communication connections 570. An interconnection mechanism (not shown) such as a bus, a controller, or a network, interconnects the components of the computing environment 500. Typically, operating system software (not shown) provides an operating environment for other software executing in the computing environment 500, and coordinates activities of the components of the computing environment 500.

The storage 540 may be removable or non-removable, and includes non-volatile solid state memory, magnetic disks, or any other medium which can be used to store information and that can be accessed within the computing environment 500. The storage 540 stores instructions for the software 580, plugin data, and messages, which can be used to implement technologies described herein.

The input device(s) 550 may be, for example, a pressure sensor, a temperature sensor, a position encoder, or a touch input device such as a keyboard, keypad, mouse, touch screen display, pen, or trackball, a voice input device, a scanning device, or another device, that provides input to the computing environment 500. The output device(s) 560 may be a wired or wireless signal transmitter, a display, or another device that provides output from the computing environment 500.

The communication connection(s) 570 enable communication over a communication medium (e.g., a connecting network) to devices or computing entities. The communication medium conveys information such as control signals, computer-executable instructions, sensor inputs or outputs, or other data in a modulated data signal. The communication connection(s) 570 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed controlled devices.

Some embodiments of the disclosed methods can be performed using computer-executable instructions implementing all or a portion of the disclosed technology in a computing cloud 590 or other remote computing system. For example, the disclosed methods can be executed on processing units 510 located in the computing environment 590, or the disclosed methods can be executed on servers located in the computing cloud 590.

Computer-readable media are any available media that can be accessed within a computing environment 500. By way of example, and not limitation, with the computing environment 500, computer-readable media include memory 520 and/or storage 540. As should be readily understood, the term computer-readable storage media includes the media for data storage such as memory 520 and storage 540, and not transmission media such as modulated data signals.

Explanation of Terms

For purposes of this description, certain aspects, advantages, and novel features of the embodiments of this disclosure are described herein. The disclosed methods, apparatus, and systems are not limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved. The scope of this disclosure includes any features disclosed herein combined with any other features disclosed herein, unless physically impossible.

Although the operations of some of the disclosed embodiments are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed components can be used in conjunction with other components.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. Such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing material quantities, angles, pressures, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art.

When directly and explicitly distinguishing embodiments from discussed prior art, the embodiment numbers are not approximates unless the word "about" is recited. Furthermore, not all alternatives recited herein are equivalents.

Although there are alternatives for various components, parameters, operating conditions, etc., set forth herein, that does not mean that those alternatives are necessarily equivalent and/or perform equally well. Nor does it mean that the alternatives are listed in a preferred order unless stated otherwise.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims. We therefore claim all that comes within the scope and spirit of these claims.

The invention claimed is:

1. A method, comprising:
    through a pressure tap, measuring pressure fluctuations inside a fluidized bed reactor over a selected time period at a location of the pressure tap along an axis of the fluidized bed reactor;
    determining a pressure parameter indicative of amplitudes of the pressure fluctuations measured at the location of the pressure tap;
    comparing the pressure parameter to a specified threshold; and
    controlling particle additions to the fluidized bed reactor when the pressure parameter deviates from the specified threshold.

2. The method of claim 1, wherein the pressure tap is at or below a location where gas is injected into the fluidized bed reactor.

3. The method of claim 1, wherein the pressure tap is at or below a location where gas bubbles form in a fluidized bed of the fluidized bed reactor.

4. The method of claim 1, wherein determining the pressure parameter further comprises determining a difference between a maximum pressure and a minimum pressure over the selected time period.

5. The method of claim 4, wherein determining the pressure parameter further comprises determining a moving average of the difference between the maximum pressure and the minimum pressure of the selected time period and at least one earlier time period.

6. The method of claim 1, wherein determining the pressure parameter further comprises determining a moving average of maximum pressure amplitudes based on the selected time period and at least one earlier time period.

7. The method of claim 1, wherein determining the pressure parameter further comprises determining a standard deviation of the pressure over the selected time period.

8. The method of claim 1, wherein determining the pressure parameter further comprises determining a standard deviation of pressure maximums over the selected time period, determining a standard deviation of pressure minimums over the selected time period, determining a pressure variance over the selected time period, or any combination thereof.

9. The method of claim 1, further comprising:
    determining a difference between the pressure parameter and the specified threshold; and
    wherein controlling particle additions further comprises determining a rate at which to add particles to the fluidized bed reactor based at least in part on the difference between the pressure parameter and the specified threshold.

10. The method of claim 1, wherein controlling particle additions further comprises increasing a rate at which particles are added to the fluidized bed reactor when the pressure parameter is below the specified threshold and decreasing the rate at which particles are added to the fluidized bed reactor when the pressure parameter is above the specified threshold.

11. The method of claim 1, further comprising pyrolizing silicon-bearing gas in the fluidized bed reactor to produce polysilicon particles.

12. A method, comprising:
    through a pressure tap, measuring pressure fluctuations inside a fluidized bed reactor over a selected time period at a location of the pressure tap along an axis of the fluidized bed reactor;
    determining a pressure parameter indicative of amplitudes of pressure fluctuations measured at the location of the pressure tap;
    comparing the pressure parameter to a pressure parameter set point;
    determining a rate at which to add particles to the fluidized bed reactor based at least in part on the comparison of the pressure parameter and the pressure parameter set point; and
    transmitting control signals to a particle supply system to supply particles to the fluidized bed reactor at the determined rate.

13. The method of claim 12, wherein determining the pressure parameter further comprises determining a difference between a maximum pressure and a minimum pressure over the selected time period.

14. The method of claim 13, wherein determining the pressure parameter further comprises determining a moving average of the difference between the maximum pressure and the minimum pressure of the selected time period and at least one earlier time period.

15. The method of claim 12, wherein determining the pressure parameter further comprises determining a moving average of maximum pressure amplitudes based on the selected time period and at least one earlier time period.

16. The method of claim 12, wherein determining the pressure parameter further comprises determining a standard deviation of a pressure over the selected time period, determining a standard deviation of pressure maximums over the selected time period, determining a standard deviation of pressure minimums over the selected time period, determining a variance of a pressure over the selected time period, or any combination thereof.

17. A system, comprising:
    a reactor vessel;
    a pressure sensor configured to sense a pressure inside the reactor vessel through a pressure tap located along an axis of the reactor vessel;
    a particle supply system in fluid communication with the reactor vessel;
    and a controller configured to:
        receive data of the pressure in the reactor vessel measured at the location of the pressure tap from the pressure sensor over a selected time period;
        determine a pressure parameter indicative of amplitudes of pressure fluctuations at the location of the pressure tap over the selected time period based at least in part on the data of the pressure in the reactor vessel measured at the location of the pressure tap;

compare the pressure parameter to a pressure parameter set point;

determine a rate at which to add particles to the reactor vessel based at least in part on the comparison of the pressure parameter and the pressure parameter set point; and transmit control signals to the particle supply system to supply particles to the reactor vessel at the determined rate.

18. The system of claim 17, wherein determining the pressure parameter further comprises determining a difference between a maximum pressure and a minimum pressure over a selected time period associated with gas bubbles emerging from an at least partially fluidized particle bed in the reactor vessel.

19. The system of claim 18, wherein determining the pressure parameter further comprises determining a moving average of the difference between the maximum pressure and the minimum pressure of the selected time period and at least one earlier time period.

20. The system of claim 17, wherein determining the pressure parameter further comprises determining an average maximum pressure in the reactor vessel over the selected time period, determining a standard deviation of the pressure over the selected time period, determining a variance of a pressure over the selected time period, or any combination thereof.

* * * * *